(No Model.)
E. HORTON.
MACHINE FOR ORNAMENTING METAL SURFACES.
No. 278,139. Patented May 22, 1883.
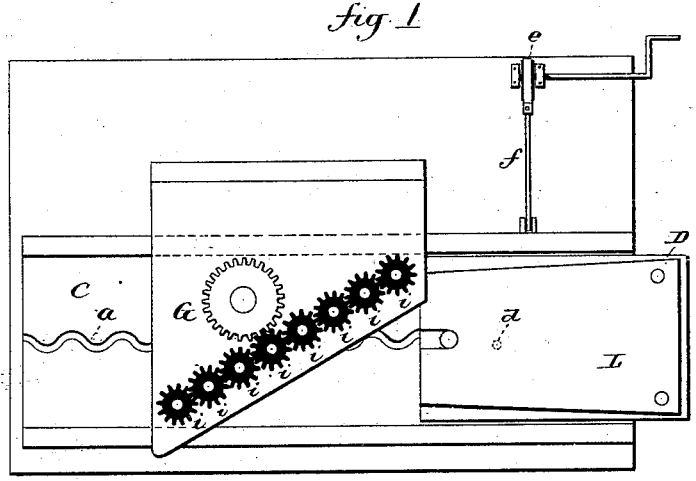
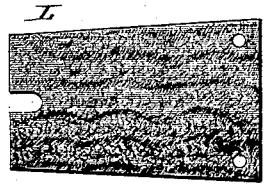
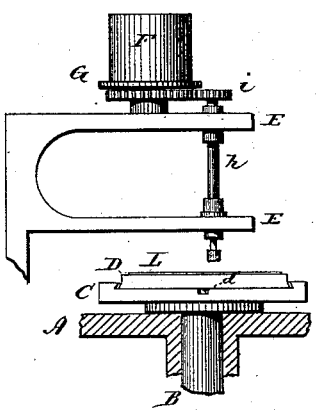
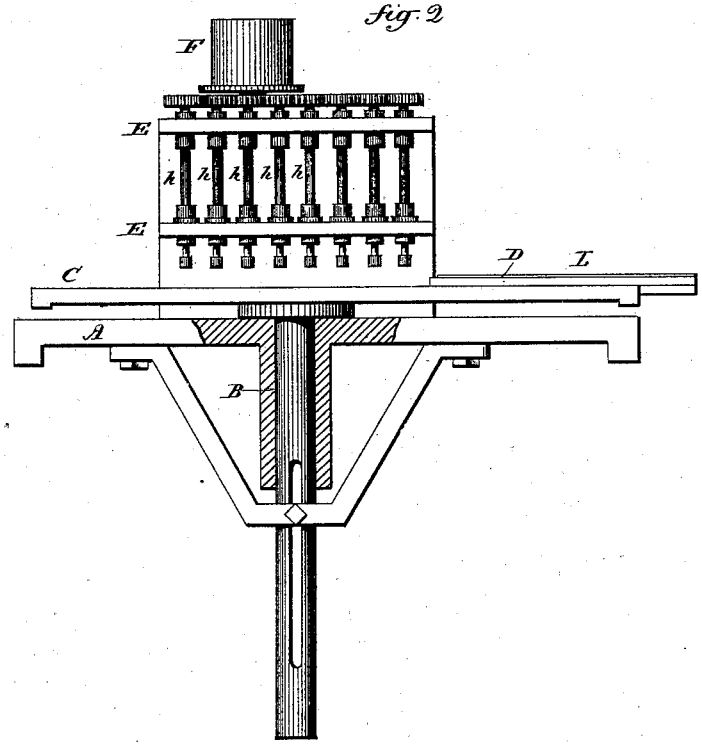
Witnesses,
Everett Horton,
Inventor
By Atty.

UNITED STATES PATENT OFFICE.

EVERETT HORTON, OF NEW HAVEN, CONNECTICUT.

MACHINE FOR ORNAMENTING METAL SURFACES.

SPECIFICATION forming part of Letters Patent No. 278,139, dated May 22, 1883.

Application filed March 21, 1883. (No model.)

*To all whom it may concern:*

Be it known that I, EVERETT HORTON, of New Haven, in the county of New Haven and State of Connecticut, have invented a new Improvement in Machines for Ornamenting Metal Surfaces; and I do hereby declare the following, when taken in connection with accompanying drawings and the letters of reference marked thereon, to be a full, clear, and exact description of the same, and which said drawings constitute part of this specification, and represent, in—

Figure 1, a top or plan view; Fig. 2, a front view; Fig. 3, an end view; Fig. 4, the ornamented plate.

This invention relates to a machine for ornamenting the surface of metal plates, with special reference to the ornamenting of plates for the finer classes of clock-movements, but applicable to other purposes. The ornamentation designed to be given to such plates is that of a laminated or watered appearance; and the invention consists in a platen to carry the plate to be ornamented, and having imparted to said plate a combined oscillatory and serpentine advancing movement, with a cutter or cutters arranged to revolve upon the axis at right angles to said platen, and as more fully hereinafter described.

A represents the frame of the machine, in which, in suitable bearings, is a vertical spindle, B. This spindle carries a horizontal bed, C, free to turn in a horizontal plane, the said spindle being the center of motion. In the upper surface of the bed C is a serpentine groove, $a$, running longitudinally from end to end. On this bed C the platen D is arranged. Upon its under side it is provided with studs $d$, which run in the groove $a$, the said groove forming a guide for the platen. Hence, if the platen be moved longitudinally on the table, the serpentine groove will impart to the said platen a corresponding serpentine movement. An oscillatory movement is imparted to the bed C—here represented as by means of an eccentric, $e$, connected by a rod, $f$, to the bed, the said eccentric rotated by a crank, as shown, or otherwise. Above the bed, in suitable bearings, E, and in a line diagonally across the bed, several spindles, $h$, are arranged so as to revolve on an axis at right angles to the plane of the platen. At their upper end these spindles are connected by gears $i$, and power is imparted to revolve the spindles by a pulley, F, carrying a pinion, G, which works into one of the gears $i$. By thus connecting the spindles together each spindle revolves in the opposite direction to the one next to it. At the lower end each of these spindles carries a tool, $l$, the lower or working face of these tools adjusted and so as to all stand in the same plane.

The plate, L, to be ornamented is secured to the platen D, the platen being drawn to one end for that purpose, and when properly secured the operator pushes the platen toward the revolving tools, which are adjusted so as to just dress the surface of the plate L, at the same time giving to the bed C an oscillatory movement, as above described, and which imparts to the plate, as it passes beneath the cutters, the combined oscillatory movement of the bed with the serpentine movement of the platen, this movement defining the path in which the tools will work on the surface of the plate, and this peculiar path gives to the surface dressed by the tools a laminated or watered appearance highly ornamental. The peculiar surface is difficult to illustrate; but I show in Fig. 4 an illustration of this surface as well as it can be done in a drawing.

The tools which I employ have a mill-like face; but substantially the same result is attained by employing a mass of points arranged in a plane, so that the points work upon the surface of the metal. A single tool may be employed; but such single tool would necessitate several movements of the plate beneath it, whereas by employing several tools and arranging them in a diagonal line, so that the whole width of the plate is covered by the tools, the plate is ornamented at a single operation, and by arranging the tools so that they revolve in the opposite direction to those next to them better results are attained than can be done by a single tool.

Instead of gearing the spindles together, as shown, the same result will be attained by a belt, which will pass around first the pulley on the one spindle, then around the next in the opposite direction, and so on. I therefore do not wish to limit the invention to the gearing of the spindles together.

While I have represented the oscillation of the bed as produced by hand, and also the longitudinal movement imparted to the platen by hand, it will be understood by those familiar with the art that these may be done by mechanical means, and combined so as to make the movement of the bed and platen automatic, without departing from my invention.

I claim—

1. The combination of a bed, C, arranged for oscillatory movement in a horizontal plane, the platen D, arranged for longitudinal movement on said bed in a serpentine path, with a cutter revolving in a plane parallel with the surface to be ornamented, substantially as described.

2. The combination of the oscillating bed C, the platen D, arranged thereon to move in a serpentine longitudinal path on said bed, with a series of tools arranged to revolve in planes parallel with the plane of the platen, and in a line diagonally across said bed, substantially as described.

3. The combination of the oscillating bed C, the platen D, arranged thereon to move in a serpentine longitudinal path on said bed, with a series of tools arranged to revolve in planes parallel with the plane of the platen, and in a line diagonally across said bed, each tool revolving in a direction opposite to that of the tool next to it, substantially as described.

EVERETT HORTON.

Witnesses:
  JOHN E. EARLE,
  JOS. C. EARLE.